United States Patent [19]
Menigat

[11] 3,772,998
[45] Nov. 20, 1973

[54] METHOD OF AND APPARATUS FOR THE COMBUSTION OF SLUDGE

[75] Inventor: Richard Menigat, Dietzenbach, Germany

[73] Assignee: Mettalgesellschaft AG, Frankfurt am Main, Germany

[22] Filed: July 9, 1971

[21] Appl. No.: 161,071

[30] Foreign Application Priority Data
July 29, 1970 Germany.................. P 20 37 561.5

[52] U.S. Cl...................... 110/8 R, 110/12, 110/15
[51] Int. Cl............................................... F23g 7/00
[58] Field of Search...................... 110/7 R, 8 R, 12, 110/15

[56] References Cited
UNITED STATES PATENTS

| | | |
|---|---|---|
| 3,589,313 | 6/1971 | Smith et al.............................. 110/8 |
| 2,286,309 | 6/1942 | Rowen................................... 110/12 |
| 2,138,120 | 11/1930 | Raisch ................................... 110/12 |
| 2,213,668 | 9/1940 | Dundas et al.......................... 110/15 |
| 3,351,030 | 11/1967 | Albertson et al. ...................... 110/7 |
| 3,515,381 | 6/1970 | Foch................................... 110/8 X |

Primary Examiner—Kenneth W. Sprague
Attorney—Karl F. Ross

[57] ABSTRACT

A method of and an apparatus for the combustion of sludge obtained from a clarifier in the purification of water, wherein the clarifier sludge is passed through a multistage drier above a fluidized-bed furnace in which it is predried with the waste mass of the latter. As the wastes dry, they are comminuted and distributed over the cross section of the fluidized-bed furnace for burning therein.

7 Claims, 2 Drawing Figures

METHOD OF AND APPARATUS FOR THE COMBUSTION OF SLUDGE

FIELD OF THE INVENTION

My present invention relates to a method of and an apparatus for the burning of clarifier sludge and, more particularly, to a system for disposing of the sludges recovered as wastes in water-purification plants.

BACKGROUND OF THE INVENTION

In the treatment of sewage or organically contaminated water, especially domestic, municipal or industrial sewage, it is a known practice to introduce flocculants and other materials into the raw water or a sewage which may or may not be oxygenated, to cause agglomeration of the organic matter concurrently with or subsequently to some biological degradation or breakdown thereof. In a subsequent stage, the the solids are settled from the water which is decanted, can be filtered and generally is treated with a disinfectant. The water may be subjected to several such settling and solid-removal stages, depending upon the degree of contamination. Since the solid wastes contain microorganisms which are effective in breaking down the wastes contained in contaminated water, it is common practice to contact the latter with a sludge derived from previous processing operations. Such activated-sludge techniques promote removal of organic contaminants from the sewage or raw waste of the type previously described.

After contact with the sludge, the water-sludge slurry may be passed into a clarifier in which the sludge is settled for partial or total recirculation, while the purified water is decanted. Sludge may also be separated by filtering and other techniques.

Disposal of the sludge has been a problem in many processes and it is, for example, possible to treat the sludge so that it contains no pathogenic or harmful microorganisms and can be effectively used as a fertilizer. Frequently, however, the additional treatment of the sludge required to be converted into a useful product is expensive to the point that the economy of the entire water-treatment or sewage-treatment system may be in jeopardy. In such cases a less expensive disposal of the sludge is desired. It has been proposed, in this connection, to burn clarifier sludges. The difficulties involved in the combustion of clarifier sludges are considerable, owing to the physical property of the sludge as it is removed from the clarifier. Firstly, clarifier sludges are often obtained in a consistency or viscosity ranging from a thin flowable liquid to a thick viscous liquid, to a nonflowable paste. Furthermore, the consistency or viscosity of the sludge may vary within relatively short periods. To facilitate combustion of the sludge, therefore, it has been proposed to eliminate excess water by a dewatering process in a filter or centrifuge, by a drying process in which water is evaporated, or by a combination of both. The systems are extremely expensive both to operate and to construct, since dewatering arrangements invariably require arrangements for treating the sludge, recovering and storing the filter cake, handling the filter cake etc. The process is time-consuming and requires considerable labor and space and has the disadvantage that the sludge or waste must come in contact with operating personnel and thereby create a health hazard.

Many prior-art proposals have similar or additional disadvantages. For example, there have been suggestions which may not yet have become state of the art, for the combustion of sludge in multiple-hearth furnaces wherein, toward the discharge end of the furnace, combustion is effected while drying takes place at the charging end. In such systems, the waste matter or sludge moves counter to the combustion and exhaust gases, the latter serving to dry and preheat the sludge before it moves into the combustion stage. In such systems, excessively moist sludge, i.e., sludge with a high water content, may be detrimental to the process because it may be insufficiently dried and preheated before entering the combustion stage and may interfere with the combustion process. On the other hand, if the moisture content of the sludge is low, the heat of the exhaust gases may be used inefficiently or insufficiently so that hot exhaust gases are discharged from the system and the heat losses are considerable. High exhaust-gas temperatures may damage the flue, the dust-separating systems downstream of the flue, or the chimney.

In order to eliminate some of these disadvantages, systems for dewatering the sludge to a constant moisture content have been proposed. These systems have the disadvantage that an additional apparatus is required and that dewatered sludge must be transferred from the dewatering apparatus to the furnace. The system, generally using conveyors, creates unsanitary or noisome conditions. Furthermore, it is difficult to control the feed rate or furnace when a dewatering arrangement is provided in the line because of the inherent time lags.

Still another suggestion which is intended to avoid the disadvantages of multiple-hearth furnaces charged with wet sludge, makes use of a total drying of the sludge before it is introduced into the multiple-hearth furnace. This system has the obvious disadvantage that the drying stage is an expensive addition to the plant and has thermal requirements which may be only partly supplied by the combustion process. Exhaust gas and clarifier sludge energies are utilized with low efficiencies.

I may also mention briefly two other combustion processes which have not been found to be fully practical for the combustion of sludge. The first is a fluidized-bed system in which wastes may be burned but which must be charged with specially prepared materials, must be provided with special nozzles and which is difficult to control. The other is a raked-bed process, whereby materials drying in an upper portion of the furnace is cascaded downwardly into a furnace chamber below. While fluidized-bed furnaces have the advantage that the burned product does not evolve smoke or smell which is released to the atmosphere, and the advantage that control is more convenient, all prior-art efforts to introduce wet, moist or pasty sludge have proved to be unsatisfactory unless dewatering steps have been practiced and the wastes transformed into a highly viscous state. The term "highly viscous" is used herein to revert to a substantially thixotropic condition in which the sludge is a paste which retains its shape. For example, a hole pierced in a layer of sludge will not be self-closing. In all of the processes of the latter type, difficulties have been encountered with the distribution of the waste material over the cross-section of the combustion chamber and such nonuniformity is characterized, on the one hand, by sintering or baking of the material where overheating occurs, and of unsatisfactory maintenance of the fluidized bed. The fluidized bed breaks down or is rendered inhomogeneous as a result of such overheating and irregular combustion may occur which may result in termination of the combustion process.

OBJECTS OF THE INVENTION

It is the principal object of the present invention to provide an improved method of burning clarifier sludge and like materials of variable viscosity whereby the aforementioned disadvantages can be obviated.

It is another object of the invention to provide an apparatus for the combustion of sludge which is readily controlled, is free from the inhomogeneity characterizing earlier systems, is highly efficient and can operate with maximum heat utilization.

Still another object of this invention is the provision of a method of and an apparatus for the combustion of sludge which enables the starting material to be relatively viscous or of low viscosity, as required, without detrimentally affecting the burning process.

SUMMARY OF THE INVENTION

I have found, surprisingly, that the above-mentioned disadvantages can be avoided, eliminated or ameliorated in a sludge-burning method and apparatus in which a fluidized bed forms the combustion zone and is surmounted by a multistage drying and preheating zone such that the exhaust gases of the combustion zone rise directly through the multistage zone above the fluidized bed. An important feature of this invention is the fact that the multistage drying and preheating zone is constituted in the form of a multiple-hearth furnace with annular supporting surfaces, each associated with one or more rotary brakes or agitators whch continuously break up the layer on the respective stage and maintain a movement of the sludge downwardly from one stage to the next until a dried, preheated, comminuted, solid material is distributed over the entire cross-section of the fluidized bed.

Hence it is essential to the present invention that the fluidizing gases contain oxygen so as to effect a combustion in the bed, that the wastes are comminuted and transformed into a particulate or other subdivided form during the drying and preheating process, and that the comminuted dry matter is distributed over the grate area of the fluidized-bed furnace.

As already noted, the simultaneous drying and comminuting of the wastes is effected in a multiple-hearth furnace having a plurality of vertically spaced, coaxial annular hearths heated with the rising exhaust gases from the fluidized-bed furnace which is disposed directly therebelow. This multiple-hearth furnace can be much shorter than those which have been proposed hitherto for the combustion of wastes and may have fewer hearths than the multiple-bed combustion furnaces known earlier. In fact, three to five hearths have been found to be sufficient for most purposes.

As the exhaust gases from the fluidized-bed furnace pass through the multiple-hearth furnace, gases may be generated by thermal evolution from the wastes as a result of distillation or decomposition; these gases may have a detrimental effect or may produce an undesirable odor in the region of the plant. Accordingly, I provide feed-back means for recycling exhaust gases from the multiple-hearth furnace into the fluidized-bed furnace, so that the only gases discharged into the atmosphere are the exhaust gases of the fluidized-bed furnace. The ratio of the exhaust gas portion supplied to the drying and preheating hearths to the exhaust gas discharged through the flue may vary within wide limits, and preferably between 30 and 60 percent by volume of the exhaust gas produced in the fluidized bed is used in the drying zone. The high temperatures of the fluidized-bed furnace, of course, prevent noisome and detrimental combustionable constituents from remaining in the exhaust gases above the fluidized bed.

According to the apparatus aspects of the present invention, the multiple-hearth furnace is of the type in which the annular, vertically spaced, axially superposed hearths are cantilevered from the inner wall of the housing of the drying zone and define a central space in which a shaft is rotatable, this shaft carrying a plurality of radial arms at each stage, the arms having depending plate-like rake teeth for scraping the deposit on the annular platform overhung thereby. The teeth may be provided at various inclinations to the rotation circles defined by the arms, i.e., lie along tangents or chords to induce a movement of the comminuted waste spirally inwardly or outwardly depending upon the location of the outlet for each platform. The platforms are alternately provided with outlets along the inner periphery or the outer periphery so that, for example, the comminuted drying material may be induced to flow inwardly at one annular platform, is caused to cascade downwardly onto an intercepting inner peripheral portion of the next-lower platform, is induced to move outwardly along this latter platform by the associated rake or comminution arms, and is caused to cascade downwardly along the outer periphery of this platform onto still another platform underlying same.

In addition, the apparatus comprises a fluidized-bed furnace which forms the combustion zone and is surrounded by the multiple-hearth furnace, while a transfer conduit is provided for recycling the waste gases of the multiple-hearth furnace into the fluidized-bed furnace. Surprisingly, the action of the rake teeth produces a comminuted material which is highly combustible and easily strewn across the grate of the fluidized bed, or, more specifically, across the full cross-section of the fluidized-bed furnace with uniform distribution.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
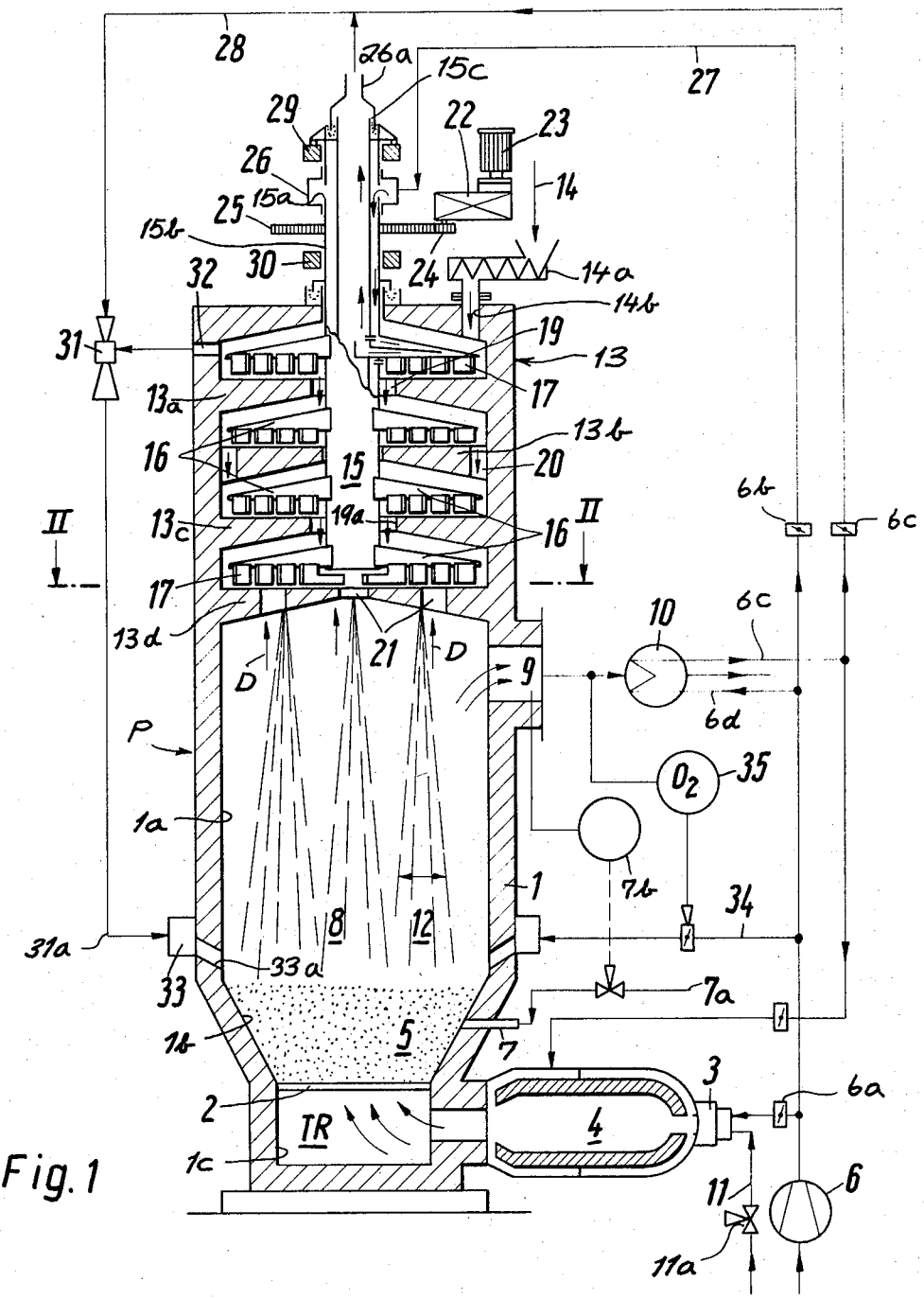
FIG. 1 is a vertical (axial) cross-sectional view through a sludge combustion plant according to the present invention.

In the drawing, I have shown a plant P for the combustion of sludge which comprises a generally cylindrical furnace shaft 1 having an outer metal shell and an inner refractory lining. The shaft 1 has a substantially cylindrical portion 1a defining a chamber 8 above a fluidized bed 5 maintained in a downwardly convergent frustoconical portion 1b of the furnace shaft 1 directly below the cylindrical portion 1a. A grate 2 spans the base of the fluidized bed 5 and may be of any conventional construction, e.g. slotted grate, cap grate, nozzle grate, etc. Such grates are known in the fluidized-bed art and can be provided directly above a wind box 1c which forms a manifold or distributing chamber (which is temperature controlled TR) through which an oxygen-containing gas is introduced into the furnace.

Fluidizing air is supplied to the bed by a blower 6 through a valve 6a and enters at the burner 3 of a combustion chamber 4 adapted to maintain the temperature of the fluidized bed at the desired level. A fuel, e.g., oil or gas, is introduced into the burner 3 by a line 11 and is controlled by a valve 11a to heat the gases traversing the chamber 4 to a temperature of 500° to 600°C. The fuel proportion is stoichiometrically insufficient to consume all of the oxygen in the gas traversing the chamber 4 and I prefer to maintain the proportion such that oxygen is stoichiometrically in excess over the quantity required for total combustion in the fluidized bed and for reaction with the fuel. To maintain heat balance, one or more lances 7 may open into the fluidized bed 5 for directly supplying oil or gas thereto as controlled by a valve 7a and a temperature regulator 7b responsive to the temperature at the flue 9 of the apparatus.

Surmounting the fluidized bed is a multiple hearth drying and preheating furnace 13 having the individual hearths 13a, 13b, 13c and 13d best seen in FIG. 1. The hearths 13a to 13d are cantilevered from the inner wall of the furnace shaft 1 and are composed of a refractory or ceramic material and have cross-sections which taper inwardly. The hearths are all annular to define a central opening in which a hollow shaft 15 is received. Furthermore, the upper part 13a has a central opening 19 through which the sludge is permitted to pass downwardly while the next-lower hearth 13b has peripheral openings 20 forming downcomers for the sludge. A central opening at 19a of the next-lower hearth 13c and openings 21 of the lowest part 13d complete the path for the solid wastes.

The predried and comminuted wastes enter the fluidized bed in countercurrent to the exhaust gases and cascade downwardly with a scattering angle represented at 12 to be distributed uniformly over the entire cross-section of the fluidized bed.

The fluidized bed, composed of quartz sand, is maintained at a temperature of 900°C or thereabove so that the solid wastes burn spontaneously upon reaching the bed. The exhaust gases rise in countercurrent to the waste. A portion of the gases pass through ports 21 as shown by arrows D to enter the drying furnace while the remainder is discharged through the flue 9 which is located in the fluidized bed portion of the furnace.

The waste is charged onto the first hearth of the furnace by a metering device 14a, here shown to be a screw conveyor, receiving the comminuted material from a hopper, as represented at 14. Since the initial downcomer 19 is located at the inner periphery of the hearth 13a, the metering device 14a opens downwardly at 14b onto the outer periphery of this hearth. In place of a screw conveyor, I may use a valve, belt or bucket conveyor or the like, with a gas-sealing arrangement for preventing the venting of undesirable gases to the atmosphere.

The hollow shaft 15 carries at each level a plurality of generally radial rake arms 16 whose stirring teeth are inclined to the direction of rotation to convey the waste inwardly or outwardly and connect the latter where the openings 21 are provided inwardly of the outer reach of the arms; the outermost teeth 17 may be designed to induce the waste to flow inwardly while the remaining teeth promote an outward movement of the waste.

The hollow shaft 15 is received in bearings 29 and 30 and is driven by a motor 23 via a speed-reducing transmission 22 and a gear chain represented by a gear 25 on the shaft and a pinion 24 driving same while being connected to the transmission 22. The hollow shaft 15 and the arms 16 are cooled by air delivered by conduit 27 and outdrawn through an outlet 26a. The inlet 26 is a hood comminuting with the spaced-apart opening 15a in the mantle 15b of the hollow shaft which has an inner tube 15b separating the air-discharge path from the air-inlet path. At each of the arms, a pair of supply and discharge passages for the air is also provided. The heated air used to cool the hollow shaft is collected at conduit 28 and is delivered, together with a bypassed portion of heated air from the blower 6, to an injector or jet fan or blower 31 which communicates via line 31a with an annular duct 33 communicating with tuyeres 33a trained at the fluidized bed. The device 31 thus induces gases generated in the multiple-hearth dryer in a recycling path into the fluidized bed. The bypassed portion of the air from blower 6 is controlled by a pair of valves 6b and 6c. Behind these valves, the blower 6 is connected by a line 6d with a heat exchanger 10, the outflow pipe 6e of which communicates with line 28. The heat exchanger 10 is traversed by the exhaust gas.

The waste gas from the drying process emerges at the top 32 of the furnace and includes gases evolved from the dried and preheated wastes and is entrained by the gas of line 28 to the furnace chamber. The jet fan or injector 31, operating in accordance with Venturi principles, maintains the desired subatmospheric pressure above the hearth. The exhaust-gas temperature of at least 800°C is maintained by the temperature regulator 7b already noted, or by an oxygen detector 35 which controls at 34 the oxygen introduced into the combustion chamber when the exhaust gas shows insufficient or excessive air. In general, I prefer to maintain some excess of air in the exhaust gas.

The combustion gas which is not used for drying, is removed from the fluidized-bed furnace through the flue 9, is caught in the heat exchanger 10 and is then discharged through a suction fan and a flue-gas cleaner.

SPECIFIC EXAMPLE

Figure 2:
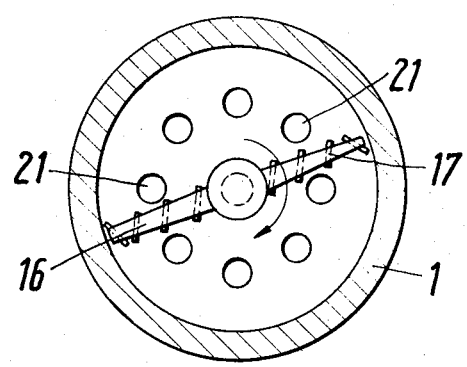
FIG. 2 is a cross-section taken along the line II — II of FIG. 1.

The combustion of clarifier sludge is carried out in an apparatus as illustrated in FIGS. 1 and 2 in which the fluidized bed chamber has a grate diameter of 1.8 meters and a grate surface area of 2.6 meters$^2$. One meter above the grate, the fluidized bed chamber widens to a diameter of 2.2m. The overall height of the fluidized bed chamber is approximately 8m, measured from the top of the grate to the upper end of the combustion chamber. The drying zone provided above the fluidized bed chamber comprises four stages as illustrated, each with an internal diameter of 2.2m and an effective drying surface area of 3.0m$^2$. The spacing of the individual stages from one another (vertically) is about 0.5m.

Through the feed device 14a, 2.25 tons per hour of clarifier sludge from a water-treatment installation of a municipality, is introduced with a solids content of 25 percent. The sludge has a heat value of about 875 kcal/kg. The sludge is dried on the individual hearths 13a, 13b, 13c and 13d and eventually cascades through openings 21 into the fluidized bed chamber there below. The drying gas passing upwardly through the openings 21 has a temperature of 850°C and a volume of 2,600 m³/hour (standard temperature and pressure STP). About 40 percent by volume of the gases formed in the fluidized bed chamber are supplied in this manner to the drying zone. During passage through the drying zone, this exhaust gas is cooled to about 350°C and evaporates about 0.72 tons of water per hour. The solids content increases as a result of the evaporation of water at 36.7 percent.

Upon entry of the predried sludge into the fluidized bed chamber, a uniform distribution of the solids is observed over the entire diameter of the chamber and the grate diameter. This distribution appears in part to be a result of the relatively long free-fall distance of the solids from the openings 21. In this free-fall period, the residual water is evaporated at a rate of 0.777 tons per hour and combustion occurs with at least part of the clarifier sludge in the fluidized bed chamber.

To maintain the fluidized bed, quartz sand serves as a contact medium and heat storage and fluidizing material and 2,600 m³/hour STP of air is introduced as the fluidizing gas. This corresponds to 1,000 m³/hour (STP) per m³ of grate area. The air excess over that stoichiometrically required to burn all of the solids of the clarifier sludge is about 1.5 expressed in terms of the ratio between the available oxygen and the stoichiometrically required oxygen. An additional 550 m³/hour of fresh air is introduced into the fluidized bed. The fresh air is supplied by the blower 6 through control valve 6b and then through the hollow shaft 15. Aside from the fresh air, I also recycle part of the exhaust gas withdrawn from the drying zone as a secondary source of air passing through a hot-gas blower 31 or a radiator.

5,550 m³/hour of exhaust gas at a temperature of 850°C is withdrawn from the fluidized bed chamber through the opening 9. Upon passage through the heat exchanger 10, the waste gas temperature is cooled to about 640°C and thus heats the fluidizing air from 20°C to 575°C. The heated fluidized air is returned to the grate 2 via the burning chamber 4. Fuel oir can be supplied to the burner chamber 4 but is not always necessary. In practice, combustion occurs without the supply fuel. Similarly fuel may be supplied at pipes 7a and 11a during the operation. In this example, the supply of further fresh air can be avoided so that pipe 34 may simply be cut off.

I claim:

1. A method of burning a sludge containing combustible solids comprising the steps of:
   simultaneously drying the sludge to produce solids and comminuting said solids by contacting the flowable material with an exhaust gas by passing the sludge onto a plurality of vertically spaced platforms and scraping material from said platforms while inducing the material to pass downwardly from one platform to another distributing the comminuted solids over the cross-section of a fluidized bed directly below said platforms by causing the material to fall freely from the lowest platform onto said bed; burning said solids in said fluidized bed in the presence of oxygen-containing fluidized gas to produce said exhaust gases and causing said exhaust gases to flow upwardly over the material on said platform; and recovering gases evolved from said material upon the drying thereof and and recycling said gas to said fluidized bed.

2. The method defined in claim 1 wherein said material is a sludge obtained from the treatment of water or sewage.

3. The method defined in claim 2 wherein said fluidized bed is a bed of quartz and is maintained at a temperature such that said exhaust gas is at a temperature of 800° to 900°C, said method further comprising the step of releasing to the atmosphere gases contacting said material only from above said fluidized bed.

4. The method defined in claim 3 wherein the recycled gas is introduced into said fluidized bed substantially in the region of the top thereof.

5. An apparatus for the combustion of a flowable material containing organic solids, comprising housing means forming a fluidized-bed chamber, a flow chamber above said fluidized bed chamber and a drying zone above said flow chamber; a grate below the fluidized-bed chamber; means for introducing an oxygen-containing fluidizing gas through said grate and into a fluidized bed sustained thereabove for burning organic solids cascading through said flow chamber onto said fluidized bed; a plurality of vertically spaced hearths in said drying zone; means for introducing said flowable material containing said organic solids at an upper one of said hearths; rotary take means sweeping across said hearths for comminuting said solids while drying same by passing said solids downwardly from hearth to hearth in said zone; means for discharging dried comminutd solids from the lowermost hearth onto said fluidized bed, and for passing an exhaust gas rising from said fluidized bed through said zone to dry the solids therein; and means for collecting gases in said zone and recycling same to said fluidized bed.

6. The apparatus defined in claim 5 wherein the last-mentioned means includes a source of compressed air and suction means operated by said compressed air for maintaining a subatmospheric pressure above said hearths.

7. The apparatus defined in claim 6 wherein said hearths are provided alternately with downcomers at their inner and outer peripheries, said rake means including an air-cooled hollow shaft extending centrally through said zone and having radial arms sweeping over each of said hearths, said arms being provided with rake teeth inclined to the direction of rotation for sweeping said solids toward the respective downcomer, said grate being provided with a wind box connected to said source, said apparatus further comprising means for venting said housing means to the atmosphere only at said flow chamber.

* * * * *